(No Model.)

F. B. JOHNSON.
CARRIAGE STEP.

No. 366,111. Patented July 5, 1887.

WITNESSES:
C. E. Tomlinson.
C. Bendixon

INVENTOR
Frank B. Johnson
BY
Duell, Laass & Duell
ATTORNEYS

UNITED STATES PATENT OFFICE.

FRANK B. JOHNSON, OF ADDISON, NEW YORK.

CARRIAGE-STEP.

SPECIFICATION forming part of Letters Patent No. 366,111, dated July 5, 1887.

Application filed April 1, 1887. Serial No. 233,253. (No model.)

*To all whom it may concern:*

Be it known that I, FRANK B. JOHNSON, of Addison, in the county of Steuben, in the State of New York, have invented new and useful Improvements in Carriage-Steps, of which the following, taken in connection with the accompanying drawings, is a full, clear, and exact description.

This invention consists in a novel, simple, and comparatively inexpensive construction of extensible carriage-steps composed, essentially, of a pendent main shank having affixed to it one of the steps, a supplemental shank sliding longitudinally on said main shank and having affixed to it the other step, a stop for limiting the movement of the supplemental shank, and a lock for retaining said latter shank in its elevated position, all as hereinafter more fully described, and specifically set forth in the claims.

Figure 1:
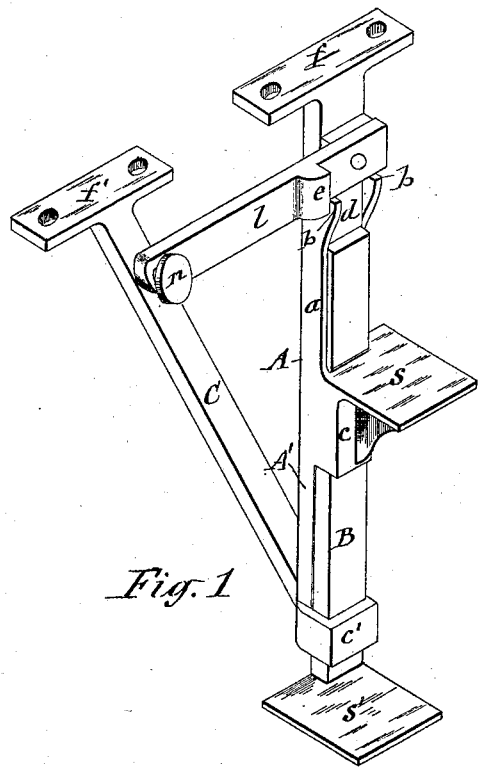
Figure 2:
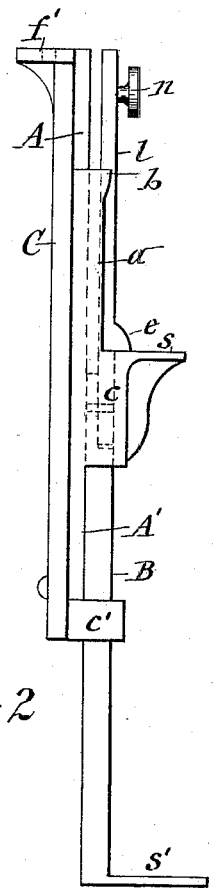

In the annexed drawings, Figure 1 is a detached perspective view of my improved extensible carriage-step in its contracted position, and Fig. 2 is a side view of the same in its extended position.

Similar letters of reference indicate corresponding parts.

A represents the main or stationary shank of the extensible carriage-steps, said shank being provided with a flange, $f$, at its upper end, by which it is secured to the under side of the side sill of the carriage-body, and is sustained in a vertical pendent position by a brace, C, secured to the lower extremity of the aforesaid shank, and provided at its upper end with the flange $f'$, by which it is also secured to the under side of the aforesaid sill of the body of the vehicle. The shank A is provided with a sleeve, $c$, from which projects the upper step, $s$, and from said sleeve upward are guide-flanges $a$ $a$, formed on opposite sides of the shank A, which guide-flanges are formed with outward-projecting shoulders $b$ $b$, for the purpose hereinafter explained. Below the sleeve $c$ the shank A is formed with a downward extension, A', the lower extremity of which is formed with a sleeve, $c'$. In the two sleeves $c$ $c'$, and between the guide-flanges $a$ $a$ of the main shank A and its extension A', slides vertically the supplemental shank B, the lower extremity of which is formed with a lower step, $s'$. The upper end of the supplemental shank is provided with a rabbet, $d$, on its outer face, and on the outer side of the rabbeted portion is pivoted a latch, $l$, the free end of which is provided with a suitable handle, $n$. The outer side of the latch is formed with a projection, $e$, for the purpose hereinafter explained.

The operation of my invention is as follows: By swinging the latch $l$ into vertical position and parallel with the supplemental shank B, the said shank is allowed to slide down on the main shank until the projection $e$ collides with the top of the sleeve $c$, as represented in Fig. 2 of the drawings. The engagement of the projection $e$ with the upper end of the sleeve $c$ serves to support the said supplemental shank so as to carry the lower step, $s'$, the proper distance from the upper step and at a convenient elevation above the ground to render the said step easily accessible for a person wishing to mount the vehicle or to alight therefrom. When the steps are not required for use, the supplemental shank is drawn up by the latch $l$ until the pivoted end thereof is brought a sufficient distance above the shoulders $b$ $b$ to allow the latch to be swung on its pivot into horizontal position, and when in said position the latch lies across the top shoulders, $b$ $b$, and thus retains the supplemental shank in its elevated position, as represented in Fig. 1 of the drawings.

Having described my invention, what I claim as new, and desire to secure by Letters Patent, is—

1. The combination of the stationary pendent main shank having affixed to it the upper step and provided with longitudinal guides, the supplemental shank sliding longitudinally on the main shank and provided with the lower step, locking-shoulders on the main shank, and a latch on the supplemental shank adapted to engage said locking-shoulders and retain the latter shank in its elevated position, substantially as described and shown.

2. The combination of the shank A, provided with the step $s$ and guide-flanges $a$ $a$, formed with locking-shoulders $b$ $b$, the shank B, sliding on the shank A and provided with the step $s'$, and the latch $l$, pivoted on the shank B and adapted to lie across the top of the two shoulders $bb$, substantially in the manner specified and shown.

3. The combination of the shank A, provided with the sleeve $c$, step $s$, projecting from said sleeve, and longitudinal guide-flanges $aa$, formed at their upper ends with locking-shoulders $bb$, the sliding shank B, provided with the step $s'$ and rabbet $d$, and the latch $l$, pivoted on the rabbeted portion of the shank B and adapted to lie across the top of the shoulders $bb$, and provided with the projection $e$, substantially as described and shown.

4. The combination of the stationary pendent shank A, provided with the sleeve $c$, step $s$, projecting from said sleeve, downward extension A', provided with the sleeve $c'$, and the guide-flanges $aa$, formed with locking-shoulders $bb$, the supplemental sliding shank B, provided at its lower end with the step $s'$ and at its upper end with the rabbet $d$, and the latch $l$, pivoted on the rabbeted portion of the shank B and adapted to lie across the top of the shoulders $bb$, and provided with the projection $e$, substantially as described and shown.

In testimony whereof I have hereunto signed my name and affixed my seal, in the presence of attesting witnesses, at Addison, in the county of Steuben, in the State of New York, this 23d day of March, 1887.

FRANK B. JOHNSON. [L. S.]

Witnesses:
 JAMES DURKIN,
 F. H. PURCELL,
 D. M. DARRIN.